United States Patent
Kumagai

(10) Patent No.: US 9,353,247 B2
(45) Date of Patent: May 31, 2016

(54) MOLDED ARTICLE AND METHOD OF PRODUCING THE SAME

(71) Applicant: CANON KABUSHIKI KAISHA, Tokyo (JP)

(72) Inventor: Takeaki Kumagai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/404,430

(22) PCT Filed: May 17, 2013

(86) PCT No.: PCT/JP2013/003163
§ 371 (c)(1),
(2) Date: Nov. 26, 2014

(87) PCT Pub. No.: WO2013/179603
PCT Pub. Date: Dec. 5, 2013

(65) Prior Publication Data
US 2015/0111988 A1    Apr. 23, 2015

(30) Foreign Application Priority Data
May 30, 2012 (JP) .................................. 2012-122913

(51) Int. Cl.
C08K 9/04 (2006.01)
B29C 43/00 (2006.01)
C08J 5/00 (2006.01)
B82Y 30/00 (2011.01)

(52) U.S. Cl.
CPC .................. C08K 9/04 (2013.01); B29C 43/006 (2013.01); B82Y 30/00 (2013.01); C08J 5/005 (2013.01); C08J 2365/00 (2013.01)

(58) Field of Classification Search
CPC .......... C08K 9/04; C08J 5/005; B29C 43/006
IPC ..................................... C08K 9/04; C08L 23/02
See application file for complete search history.

(56) References Cited

U.S. PATENT DOCUMENTS

| | | |
|---|---|---|
| 5,665,795 A | 9/1997 | Koushima et al. |
| 2005/0065255 A1 | 3/2005 | Morita et al. |
| 2006/0128869 A1 | 6/2006 | Taima |
| 2011/0213083 A1* | 9/2011 | Takamura et al. .............. 525/70 |

FOREIGN PATENT DOCUMENTS

| | | |
|---|---|---|
| JP | 2003-281942 A | 10/2003 |
| JP | 2003-342075 A | 12/2003 |

OTHER PUBLICATIONS

XP-002707980, Database WPI, Week 200636, Thomson Scientific, London, GB; AN 2006-353545 & WO 2006/051699 A1 (Konica Minolta Opto Inc) May 18, 2006, pp. 1-3.
XP-002707979, Database WPI, Week 200753, Thomson Scientific, London, GB; AN 2007-539360 & JP 2007161980 A (Konica Minolta Opto KK) Jun. 28, 2007, pp. 1-4.
XP-002707981, Database WPI, Week 200808, Thomson Scientific, London, GB; AN 2008-B11148 & JP 2007 0137941 (Sumitomo Bakelite Co Ltd) Oct. 18, 2007, pp. 1-2.
XP-002707978, Database WPI, Week 200828, Thomson Scientific, London, GB; AN 2008-D90844 & JP 2006 0097081(Sumitomo Bakelite Co Ltd) Oct. 18, 2007, pp. 1-6.

* cited by examiner

*Primary Examiner* — Vickey Nerangis
(74) *Attorney, Agent, or Firm* — Canon U.S.A., Inc., IP Division

(57) ABSTRACT

The present invention relates to a molded article exhibiting a low linear expansion coefficient and a method of producing the molded article. The molded article is molded from a resin composition containing at least a thermoplastic cyclic olefin resin and silica particles surface-modified with amino functional groups and having a number average particle diameter of primary particles of 10 nm or more and 50 nm or less. The resin composition contains the silica particles in an amount of 34% by mass or more and 85% by mass or less.

6 Claims, 1 Drawing Sheet

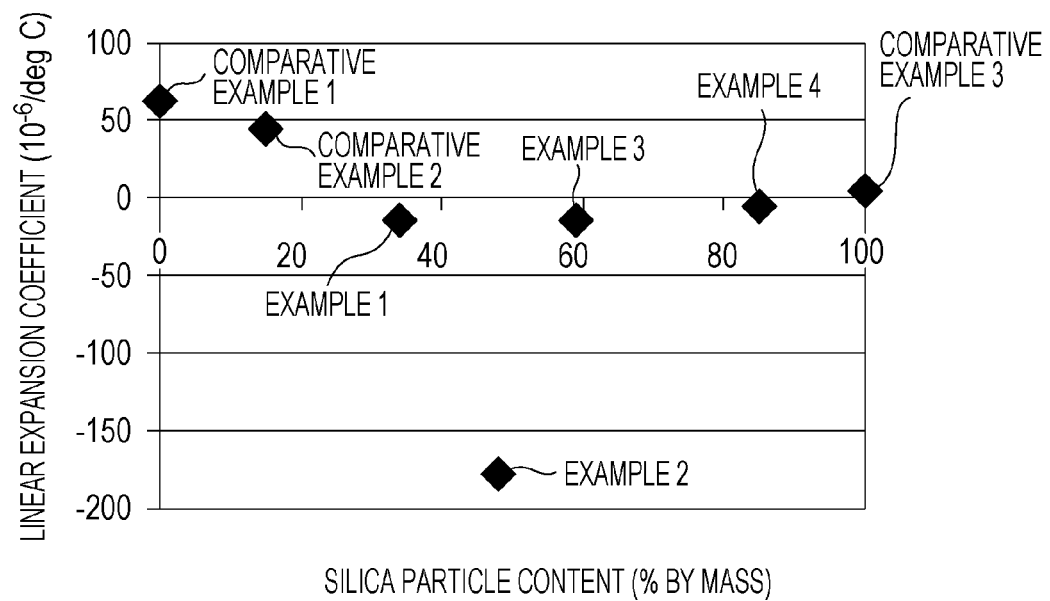

MOLDED ARTICLE AND METHOD OF PRODUCING THE SAME

TECHNICAL FIELD

The present invention relates to a molded article exhibiting a low linear expansion coefficient and a method of producing the molded article.

BACKGROUND ART

In general, substances expand by heat. Organic resin materials are particularly known to have high linear expansion coefficients. For example, in use of members composed of organic resin materials for devices such as precision optical systems, a member having a high linear expansion coefficient and exhibiting a large change in size by temperature changing may cause displacement in an optical system.

As a measure for solving this problem, there is known a method for compensating the change in size by incorporating a material having a negative linear expansion (hereinafter, referred to as "negative expansion") property into the periphery of a member composed of an organic resin material. Examples of the material having a negative expansion property include inorganic materials such as zirconium tungstate (PTL 1), lithium-aluminum-silicon oxides, and nitrides of manganese. In addition, organic materials such as liquid crystal polymers and ultrahigh molecular weight polyethylene fibers are known as materials showing negative expansion properties (PTL 2).

However, the use of an inorganic material having a negative expansion property for compensating the thermal expansion of an organic resin material has disadvantages such that molding at a temperature of 400 degrees (Celsius) or less is difficult and that it causes an increase in weight. In addition, the organic material having a negative expansion property mainly exhibit the negative expansion property in a fiber or sheet state, and it is difficult to exhibit the property in a bulk state.

Furthermore, in materials that are known to have negative expansion properties, the absolute value of the linear expansion coefficient is about $25*10^{-6}$/degree (Celsius) at a maximum. Accordingly, in order to compensate the expansion due to a change in the temperature of an organic resin material, a molded article of such a material having a negative expansion property must have a considerably large thickness or amount.

CITATION LIST

Patent Literature

PTL 1: Japanese Patent Laid-Open No. 2003-342075
PTL 2: Japanese Patent Laid-Open No. 2003-281942

SUMMARY OF INVENTION

The present invention provides a molded article exhibiting a low linear expansion coefficient and a method of producing the molded article.

The present invention relates to an article molded from a resin composition containing at least a thermoplastic cyclic olefin resin and silica particles surface-modified with amino functional groups and having a number average particle diameter of primary particles of 10 nm or more and 50 nm or less, wherein the resin composition contains the silica particles in an amount of 34% by mass or more and 85% by mass or less.

In addition, the present invention relates to a method of producing the molded article. The method includes the steps of mixing at least a thermoplastic cyclic olefin resin powder and silica particles surface-modified with amino functional groups and having a number average particle diameter of primary particles of 10 nm or more and 50 nm or less to prepare a material mixture containing the silica particles in an amount of 34% by mass or more and 85% by mass or less; and compressing the material mixture at a temperature not lower than the glass transition temperature of the cyclic olefin resin to form a molded article.

ADVANTAGEOUS EFFECTS OF INVENTION

The present invention can provide a molded article exhibiting a low linear expansion coefficient and a method of producing the molded article.

Further features of the present invention will become apparent from the following description of exemplary embodiments with reference to the attached drawing.

BRIEF DESCRIPTION OF DRAWINGS

FIG. 1 is a diagram illustrating a relationship between the silica particle contents of molded articles prepared in examples of the present invention and linear expansion coefficients.

DESCRIPTION OF EMBODIMENTS

Embodiments of the present invention will now be described in detail.

The molded article of the present invention is molded from a resin composition containing at least a thermoplastic cyclic olefin resin (Cyclo Olefin Polymer) and silica particles surface-modified with amino functional groups and having a number average particle diameter of primary particles of 10 nm or more and 50 nm or less. The resin composition contains the silica particles in an amount of 34% by mass or more and 85% by mass or less. The molded article of the present invention exhibits a negative linear expansion coefficient in a temperature range of 20 to 60 degrees (Celsius).

The molded article of the present invention exhibits a very low linear expansion coefficient, about $-178*10^{-6}$/degree (Celsius) at a minimum, at least in a temperature range of 20 to 60 degrees (Celsius) and, therefore, can be used as a low expansion member or a temperature compensating member that is used in precision optical devices such as optical fibers, lenses, and mirrors.

Cyclic Olefin Resin

The cyclic olefin resin used in the present invention will be described.

The cyclic olefin resin in the present invention refers to a polymer having a cyclic olefin structure. Specific examples of the cyclic olefin resin used in the present invention include polymers that are obtained by ring-opening polymerization of cyclic unsaturated hydrocarbons and polymers that are obtained by hydrogen reduction of copolymers of cyclic unsaturated hydrocarbons and alpha-unsaturated hydrocarbons. Commercially available examples of the cyclic olefin resin include ZEONEX (product name, manufactured by Zeon Corporation), APEL (product name, manufactured by Mitsui Chemicals, Inc.), ARTON (product name, manufactured by JSR Corporation), and TOPAS (product name, manufactured by Topas Advanced Polymers GmbH). The cyclic olefin resin may have any molecular weight and can have a number average molecular weight of 10000 or more from the viewpoints of, for example, molding workability and the strength of molded products.

The cyclic olefin resin used in the present invention may be a mixture of two or more polymers or may be a copolymer of two or more monomers. In the case of using a copolymer of two or more monomers, the repetition of structural units forming the copolymer is not specifically restricted. For example, any one of an alternate structure, a random structure, and a block structure may form the periodic structure of a polymer, or a combination of these structures may form a polymer chain. Furthermore, a cross-linking structure may be formed in the polymer molecule.

The cyclic olefin resin used in the present invention can have a glass transition temperature of 80 degrees (Celsius) or more and 300 degrees (Celsius) or less, such as 100 degrees (Celsius) or more and 200 degrees (Celsius) or less. If the glass transition temperature is lower than 80 degrees (Celsius), sufficient heat resistance may not be imparted to the resulting molded article. If the glass transition temperature is higher than 300 degrees (Celsius), a high temperature is required for molding, which makes the processing difficult and also may cause problems such as coloring of the molded article.

The cyclic olefin resin used in the present invention may contain additives. Examples of the additive include phosphorus processing stabilizers, hydroxylamine processing stabilizers, antioxidants such as hindered phenols, light stabilizers such as hindered amines, ultraviolet absorbers such as benzotriazoles, triazines, benzophenones, and benzoates, plasticizers such as phosphates, phthalates, citrates, and polyesters, mold-releasing agents such as silicones, flame retardants such as phosphates and melamines, antistatic agents such as fatty acid ester surfactants, organic dye colorants, and impact modifiers.

These additives may be used alone or in combination. These additives can be used in an amount of 20% by mass or less of the amount of the molded article. If the amount of the additives is higher than 20% by mass, the physical properties, such as low moisture absorbency, of the cyclic olefin resin may not be provided.

Silica Particles

The silica particles in the present invention are surface-modified with amino functional groups. Though a method of reducing the linear expansion coefficient of an organic resin material by adding inorganic particles to the organic resin material has been known, the degree of the reduction in the linear expansion coefficient by this method is insufficient. The reduction in linear expansion coefficient is believed to be affected by surface interaction between an organic resin material and inorganic particles or between inorganic particles themselves and by how the inorganic particles are mixed. In the present invention, a large reduction in linear expansion coefficient is achieved by adding silica particles surface-modified with amino functional groups to a cyclic olefin resin.

Examples of the amino functional group include, but not limited to, a 4-aminobutyl group, an N-(2-aminoethyl)-3-aminopropyl group, an N-(2-aminoethyl)-11-aminoundecyl group, an N-(6-aminohexyl)aminopropyl group, an N-phenyl-3-aminopropyl group, an (aminoethylaminomethyl) phenythyl group, a 3-(m-aminophenoxy)propyl group, an m-aminophenyl group, a p-aminophenyl group, a 3-aminopropyl group, a 3-dimethylaminopropyl group, an N,N-dimethylaminopropyl group, an N-methylaminopropyl group, and an ureidopropyl group.

The silica particles may be surface-modified with other functional groups, as long as they are surface-modified with amino functional groups. For example, the surfaces of the silica particles may be further modified with hydrophobic functional groups for increasing the dispersibility.

The silica particles can have a number average particle diameter of primary particles of 1 nm or more and 100 nm or less, such as 10 nm or more and 50 nm or less. If the number average particle diameter of the silica particles is larger 100 nm, the low linear expansion characteristics may be lost with a reduction in surface area.

Incidentally, the diameter of a particle in the present invention is the diameter of a sphere having the same volume as that of the particle.

As the silica particles surface-modified with amino functional groups, commercially available products such as RA200H (manufactured by Nippon Aerosil Co., Ltd.) or NA50H (manufactured by Nippon Aerosil Co., Ltd.) can be used. The silica particles surface-modified with amino functional groups can also be prepared by modifying the surfaces of silica, of which surfaces are not modified, with a silane coupling agent having an amino group.

The silica particles used in the present invention contain silica (silicon oxide) as the main component and may further contain another metal. The content of silica in the silica particles can be 50% by mass or more, such as 80% by mass or more.

Method of Producing Molded Article

A method of producing a molded article of the present invention will now be described.

The method of producing a molded article of the present invention includes a step of preparing a material mixture by mixing at least a powder of a thermoplastic cyclic olefin resin and silica particles surface-modified with amino functional groups. The method further includes a step of compressing the resulting material mixture under heating to prepare a molded article. In the method of producing a molded article of the present invention, a molded article having a low linear expansion coefficient can be produced by using a material mixture containing silica particles having a number average particle diameter of primary particles of 10 nm or more and 50 nm or less in an amount of 34% by mass or more and 85% by mass or less.

Step of Preparing Material Mixture

The cyclic olefin resin and the silica particles used in the present invention are directly mixed with each other in powder forms.

The cyclic olefin resin in a powder form can be prepared by, for example, mechanically pulverizing a pellet of a cyclic olefin resin with a pulverizer into microparticles. As the pulverizer, for example, Wonder-Blender (product name) manufactured by Osaka Chemical Co., Ltd. can be used.

In a direct mixing method, in order to prevent precipitation of the silica particles having a larger specific gravity than that of the cyclic olefin resin, aggregates of both powders should have similar particle diameters. Furthermore, in order to prepare a molded article having high uniformity of the materials, the diameters of aggregates of both powders should be small, such as 100 micrometers or less.

The device for mixing the cyclic olefin resin powder and the silica particles may be a well-known powder mixer for mixing powders. Examples of the powder mixer include mortars, agitators such as handy mixers and laboratory mixers, air blenders, container blenders, and gravity type blenders.

In the step of preparing a material mixture, a cyclic olefin resin powder and silica particles are mixed with each other such that the content of the silica particles is 34% by mass or more and 85% by mass or less. When the content of the silica particles is 34% by mass or more, the degree of the reduction in linear expansion coefficient of the resulting molded article is high. Though an increase in the content of the silica particles is effective for reducing the linear expansion coefficient, the increase of the content causes brittleness and reduces the moldability. Accordingly, the content of the silica particles should be 85% by mass or less.

Step of Preparing Molded Article

The thus-prepared powder mixture of the cyclic olefin resin powder and the silica particle powder is molded into an intended shape by heat press-molding, i.e., compressing the mixture at a temperature of not lower than the glass transition temperature of the cyclic olefin resin. The temperature for the heat press-molding can be 150 degrees (Celsius) or higher and 300 degrees (Celsius) or lower. If the temperature for the heat press-molding is lower than 150 degrees (Celsius), molding into an intended shape is difficult. A temperature of higher than 300 degrees (Celsius) accelerates thermal decomposition to cause yellowing of the molded article and increases the linear expansion coefficient. The pressure for molding should be 50 MPa or more for transferring the shape.

The molded article can have various shapes such as a sphere, bar, plate, block, cylinder, spindle, fiber, grid, film, or sheet-like shape and can be used as an interior or exterior component for various machineries and as an optical element.

EXAMPLES

The present invention will now be more specifically described by Examples and Comparative Examples. The invention is not limited these Examples.

Example 1

A powder of ZEONEX E48R (product name) manufactured by Zeon Corporation as a cyclic olefin resin and Aerosil RA200H (product name) (number average particle diameter of primary particles: 12 nm) manufactured by Nippon Aerosil Co., Ltd. as silica particles surface-modified with amino functional groups were uniformly mixed and stirred such that the content of the silica particles was 34% by mass.

NOVEC-1720 (product name) manufactured by Sumitomo 3M Limited serving as a mold-releasing agent was dropped onto the surface, with which materials would be brought into contact, of a 6-mm square mold for press-molding and was well wiped. The mold for press-molding was charged with the mixture of the cyclic olefin resin powder and the silica particle powder and was set to a small heat-pressing machine (AH-2003 (product name), manufactured by AS ONE Corporation) and heated to 200 degrees (Celsius). After temperatures at the upper and lower surfaces of the small heat-pressing machine reached 200 degrees (Celsius), the mold was pressed under a load of 110 MPa, and then the load was allowed to naturally decrease with naturally cooling the mold to 100 degrees (Celsius). At 100 degrees (Celsius), the composite material was released from the mold to provide a plate-shaped molded article.

Measurement of Silica Particle Content

The content of the silica particles was measured with TGA (TGA Q500 (product name), manufactured by TA instruments Japan). The remaining weight percent when the cyclic olefin resin composition was heated to 800 degrees (Celsius) under nitrogen atmosphere was used as the content of the silica particles.

Measurement of Linear Expansion Coefficient

The linear expansion coefficient in a range of 0 to 80 degrees (Celsius) was determined by subjecting the molded article to a three-cycle temperature load in a range of 0 to 80 degrees (Celsius) with TMA (TMA Q400 (product name), manufactured by TA instruments Japan), and a linear expansion coefficient in the thickness direction in a range of 0 to 60 degrees (Celsius) was calculated. Displacement was measured with an expansion probe.

Example 2

A molded article was produced as in Example 1 except that the concentration of the silica particles was 48% by mass.

Example 3

A molded article was produced as in Example 1 except that Aerosil NA50H (product name) (number average particle diameter of primary particles: 30 nm) manufactured by Nippon Aerosil Co., Ltd. was used as silica particles surface-modified with amino functional groups and that the concentration of the silica particles was 59% by mass.

Example 4

A molded article was produced as in Example 3 except that the concentration of the silica particles was 85% by mass.

Comparative Example 1

A molded article was produced as in Example 1 except that only the cyclic olefin resin powder was used without using the silica particle powder.

Comparative Example 2

A molded article was produced as in Example 1 except that the concentration of the silica particles was 15% by mass.

Comparative Example 3

A molded article was produced as in Example 1 except that only the silica particle powder was used without using the cyclic olefin resin powder. The molded article was brittle and was broken into pieces when it was released from the mold.

EVALUATION

Table 1 shows the evaluation results of the molded articles in Examples and Comparative Examples. FIG. 1 is a graph of plots showing a relationship between the silica particle contents of molded articles prepared in Examples 1 to 4 and Comparative Examples 1 to 3 and linear expansion coefficients.

TABLE 1

| | Average particle diameter of silica (nm) | Silica particle content (% by mass) | Linear expansion coefficient ($*10^{-6}$/deg C.) | Moldability |
|---|---|---|---|---|
| Example 1 | 12 | 34 | −14 | Excellent |
| Example 2 | 12 | 48 | −178 | Excellent |
| Example 3 | 30 | 59 | −14 | Excellent |
| Example 4 | 30 | 85 | −5 | Excellent |
| Comparative Example 1 | — | 0 | 63 | Excellent |
| Comparative Example 2 | 12 | 15 | 45 | Excellent |
| Comparative Example 3 | 12 | 100 | 5 | Poor |

As shown in Table 1, it was revealed that the linear expansion coefficient of a molded article is a minus value when the content of silica particles having amino groups contained in the cyclic olefin resin composition is in a range of 34% by mass or more and 85% by mass or less.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-122913, filed May 30, 2012, which is hereby incorporated by reference herein in its entirety.

INDUSTRIAL APPLICABILITY

The thermoplastic composite material molded article of the present invention can be used as a low expansion member or a temperature compensating member that is used in precision optical devices such as optical fibers and lenses.

The invention claimed is:

1. An article molded from a resin composition at least comprising a thermoplastic cyclic olefin resin and silica particles surface-modified with amino functional groups and having a number average particle diameter of primary particles of 10 nm or more and 50 nm or less,
wherein the resin composition includes the silica particles in an amount of 34% by mass or more and 85% by mass or less, and
wherein the molded article has a negative linear expansion coefficient in a temperature range of 20 degree (Celsius) to 60 degree (Celsius).

2. The molded article according to claim 1,
wherein the thermoplastic cyclic olefin resin has a glass transition temperature of 100 degree (Celsius) or more and 200 degree (Celsius) or less.

3. The molded article according to claim 1, wherein the silica particles contain 80% by mass or more of silica.

4. The molded article according to claim 1,
wherein the molded article is formed by heat press-molding at a temperature of 150 degree (Celsius) or more and 300 degree (Celsius) or less, and a pressure of 50 MPa or more.

5. A method of producing a heat press-molded article, comprising:
mixing at least a thermoplastic cyclic olefin resin powder and silica particles surface-modified with amino functional groups and having a number average particle diameter of primary particles of 10 nm or more and 50 nm or less to prepare a material mixture containing the silica particles in an amount of 34% by mass or more and 85% by mass or less; and
heat press-molding the material mixture at a temperature of 150 degree (Celsius) or more and 300 degree (Celsius) or less, and a pressure of 50 MPa or more to form the molded article, wherein the molded article has a negative linear expansion coefficient in a temperature range of 20 degree (Celsius) to 60 degree (Celsius).

6. The method of producing the heat press-molded article according to claim 5, wherein the silica particles contain 80% by mass or more of silica.

* * * * *